United States Patent
Mierle et al.

(10) Patent No.: US 10,453,175 B2
(45) Date of Patent: Oct. 22, 2019

(54) SEPARATE TIME-WARPING FOR A SCENE AND AN OBJECT FOR DISPLAY OF VIRTUAL REALITY CONTENT

(71) Applicant: Google Inc., Mountain View, CA (US)

(72) Inventors: Keir Banks Mierle, Mountain View, CA (US); John Paul Bates, Redwood City, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/439,589

(22) Filed: Feb. 22, 2017

(65) Prior Publication Data
US 2017/0243324 A1    Aug. 24, 2017

Related U.S. Application Data

(60) Provisional application No. 62/298,415, filed on Feb. 22, 2016.

(51) Int. Cl.

| | |
|---|---|
| *G06F 3/01* | (2006.01) |
| *G06T 11/60* | (2006.01) |
| *G06T 15/00* | (2011.01) |
| *G06T 3/00* | (2006.01) |
| *G02B 27/01* | (2006.01) |
| *G06F 3/0346* | (2013.01) |
| *G06T 19/00* | (2011.01) |
| *G02B 27/00* | (2006.01) |

(52) U.S. Cl.
CPC .......... *G06T 3/0093* (2013.01); *G02B 27/017* (2013.01); *G06F 3/012* (2013.01); *G06F 3/0346* (2013.01); *G06T 11/60* (2013.01); *G06T 15/005* (2013.01); *G06T 19/006* (2013.01); *G02B 27/0093* (2013.01); *G02B 2027/0187* (2013.01)

(58) Field of Classification Search
None
See application file for complete search history.

(56) References Cited

U.S. PATENT DOCUMENTS

| | | |
|---|---|---|
| 6,008,820 A | 12/1999 | Chauvin et al. |
| 9,240,069 B1 | 1/2016 | Li |
| 2015/0310665 A1 | 10/2015 | Michail et al. |
| 2017/0155885 A1* | 6/2017 | Selstad .............. H04N 13/0059 |

FOREIGN PATENT DOCUMENTS

WO    2017/147178 A1    8/2017

OTHER PUBLICATIONS

U.S. Appl. No. 62/256,502, filed Nov. 17, 2015 (Year: 2015).*

(Continued)

*Primary Examiner* — Yingchun He
(74) *Attorney, Agent, or Firm* — Brake Hughes Bellermann LLP

(57) ABSTRACT

An example technique may include performing a first time-warping of a scene of virtual reality content based on head pose information received during or after a rendering of the scene to obtain a time-warped scene, performing a second time-warping of an object based at least on object pose information received during or after a rendering of the object to obtain a time-warped object, and displaying on a display device a composite image based on the time-warped scene and the time-warped object.

26 Claims, 8 Drawing Sheets

(56) References Cited

OTHER PUBLICATIONS

International Search Report and Written Opinion for PCT Patent Appliation No. PCT/US2017/018926, dated Apr. 18, 2017, 15 pages.
Peek, et al., "Using Integrated GPUs to Perform Image Warping for HMDs", Proceedings of 29th International Conference on Image and Vision Computing New Zealand, Nov. 19-21, 2014, pp. 172-177.
Lengyel, et al., "Rendering With Coherent Layers", Computer Graphics Proceedings, Annual Conference Series, Aug. 3, 1997, pp. 233-242.
Pasman, et al., "Low Latency Rendering and Positioning for Mobile Augmented Reality", Vision Modeling and Visualisation Proceedings, Nov. 1999, 7 pages.
Regan, et al., "Priority Rendering with a Virtual Reality Address Recalculation Pipeline", Computer Graphics Proceedings, Annual Conference Series, 1994, pp. 155-162.
Mark, et al., "Post-Rendering 3D Wraping", Symposium on Interactive 3D Graphics, ACM New York, 1997, pp. 7-16.
Evangelakos, et al., "Extended TimeWarp Latency Compensation for Virtual Reality", Proceedings of the 20th ACM SIGGRAPH Symposium on Interactive 3D Graphics and Games, Feb. 26-28, 2016, pp. 193-194.
Van Waveren, "The Asynchronous Time Warp for Virtual Reality on Consumer Hardware", Proceedings of the 22nd ACM Conference on Virtual Reality Software and Technology, Nov. 2-4, 2016, pp. 37-46.
"Oculus Unity Developer Guide", Oculus VR, LLC, Mar. 31, 2015, 41 pages.
Senin, "Dynamic Time Warping Algorithm Review", Information and Computer Science Department, University of Hawaii at Manoa, Dec. 2008, 23 pages.
"Oculus Mobile Development Documentation", Oculus CR, LLC, version 1.0.0.1, 2016, 134 pages.
Smit, et al., "A Shared-Scene-Graph Image-Warping Architecture for VR: Low Latency Versus Image Quality", Computers & Graphics, vol. 34, Issue 1, 2010, pp. 3-16.
Yang, et al., "Image-Based Bidirectional Scene Reprojection", ACM Transactions on Graphics, vol. 30, Iss. 6, Article No. 150, Dec. 2011, 10 pages.

* cited by examiner

SEPARATE TIME-WARPING FOR A SCENE AND AN OBJECT FOR DISPLAY OF VIRTUAL REALITY CONTENT

CROSS-REFERENCE TO RELATED APPLICATIONS

This application claims priority to U.S. Provisional Patent Application No. 62/298,415, filed on Feb. 22, 2016, entitled "SEPARATE TIME-WARPING FOR VIRTUAL REALITY HEADSET AND VIRTUAL REALITY CONTROLLER", the disclosure of which is incorporated by reference herein in its entirety.

TECHNICAL FIELD

This description relates to image processing and rendering of virtual reality content, and in particular, to use of video rendering and time-warping for a scene and an object to display virtual reality content.

BACKGROUND

Performing video rendering can consume a significant amount of time and computing resources in a virtual reality (VR) environment. A virtual reality application may receive or generate application data. A graphics or rendering engine may then render graphics for each frame to be displayed as part of the virtual reality content. In some cases, while the graphics engine is rendering graphics for a frame, a user's head or VR headset worn by a user may move, causing the location and/or orientation information for the user's head to be inaccurate by the time the frame is output to the display.

SUMMARY

According to an example implementation, a computer-implemented method includes performing a first time-warping of a scene of virtual reality content based on head pose information received during or after a rendering of the scene to obtain a time-warped scene, performing a second time-warping of an object based at least on object pose information received during or after a rendering of the object to obtain a time-warped object, and displaying on a display device a composite image based on the time-warped scene and the time-warped object.

According to another example implementation, an apparatus includes at least one processor and at least one memory including computer instructions, when executed by the at least one processor, cause the apparatus to: perform a first time-warping of a scene of virtual reality content based on head pose information received during or after a rendering of the scene to obtain a time-warped scene, performing a second time-warping of an object based at least on object pose information received during or after a rendering of the object to obtain a time-warped object, and displaying on a display device a composite image based on the time-warped scene and the time-warped object.

According to an example implementation, a computer-implemented method is provided for rendering virtual reality content to a display device includes receiving, at a first electronic display stabilization engine within a first processing pipeline, a main scene of the virtual reality content based on initial head pose information for a user of a virtual reality headset, and updated head pose information, performing, by the first electronic display stabilization engine, time-warping of the main scene based on the updated head pose information, receiving, at a second electronic display stabilization engine within a second processing pipeline, a graphical overlay for a virtual reality controller/object based on an initial controller/object pose information, and updated head pose information, performing, by the second electronic display stabilization engine, time-warping of the graphical overlay based on the updated controller/object pose information, generating a composite image based on the time-warped main scene and the time-warped graphical overlay for the virtual reality controller/object, and outputting the composite image to a display device.

According to another example implementation, a computer implemented system (or apparatus) is provided for rendering virtual reality content to a display device. The apparatus may include at least one processor and at least one memory including computer instructions, when executed by the at least one processor, cause the system to: receive, at a first electronic display stabilization engine within a first processing pipeline, a main scene of the virtual reality content based on initial head pose information for a user of a virtual reality headset, and updated head pose information, perform, by the first electronic display stabilization engine, time-warping of the main scene based on the updated head pose information, receive, at a second electronic display stabilization engine within a second processing pipeline, a graphical overlay for a virtual reality controller/object based on an initial controller/object pose information, and updated head pose information, perform, by the second electronic display stabilization engine, time-warping of the graphical overlay based on the updated controller/object pose information, generate a composite image based on the time-warped main scene and the time-warped graphical overlay for the virtual reality controller/object, and output the composite image to a display device.

According to an example implementation, a computer-implemented method is provided for rendering virtual reality content to a display device, the method including: rendering, in a first processing pipeline, a main scene of the virtual reality content based on head pose information for a user of a virtual reality headset, receiving, at a first electronic display stabilization engine within the first processing pipeline, either during or after the rendering of the main scene, updated head pose information, performing, by the first electronic display stabilization engine, time-warping of the main scene based on the updated head pose information, rendering, in a second processing pipeline, a graphical overlay for a virtual reality controller/object based on controller/object pose information, receiving, at a second electronic display stabilization engine within the second processing pipeline, either during or after the rendering of the overlay, updated controller/object pose information, performing, by the second electronic display stabilization engine, time-warping of the graphical overlay based on the updated controller/object pose information, generating a composite image based on the time-warped main scene and the time-warped graphical overlay for the virtual reality controller/object, and outputting the composite image to a display device.

According to another example implementation, a computer implemented system (or apparatus) is provided for rendering virtual reality content to a display device. The system may include at least one processor and at least one memory including computer instructions, when executed by the at least one processor, cause the system to: render, in a first processing pipeline, a main scene of the virtual reality content based on head pose information for a user of a virtual reality headset, receive, at a first electronic display stabilization engine within the first processing pipeline, either during or after the rendering of the main scene, updated head pose information, perform, by the first electronic display stabilization engine, time-warping of the main scene based on the updated head pose information, render, in a second processing pipeline, a graphical overlay for a virtual reality controller/object based on controller/object pose information, receive, at a second electronic display stabilization engine within the second processing pipeline, either during or after the rendering of the overlay, updated controller/object pose information, perform, by the second electronic display stabilization engine, time-warping of the graphical overlay based on the updated controller/object pose information, generate a composite image based on the time-warped main scene and the time-warped graphical overlay for the virtual reality controller/object, and output the composite image to a display device.

The details of one or more implementations are set forth in the accompanying drawings and the description below. Other features will be apparent from the description and drawings, and from the claims.

DETAILED DESCRIPTION

Figure 1:
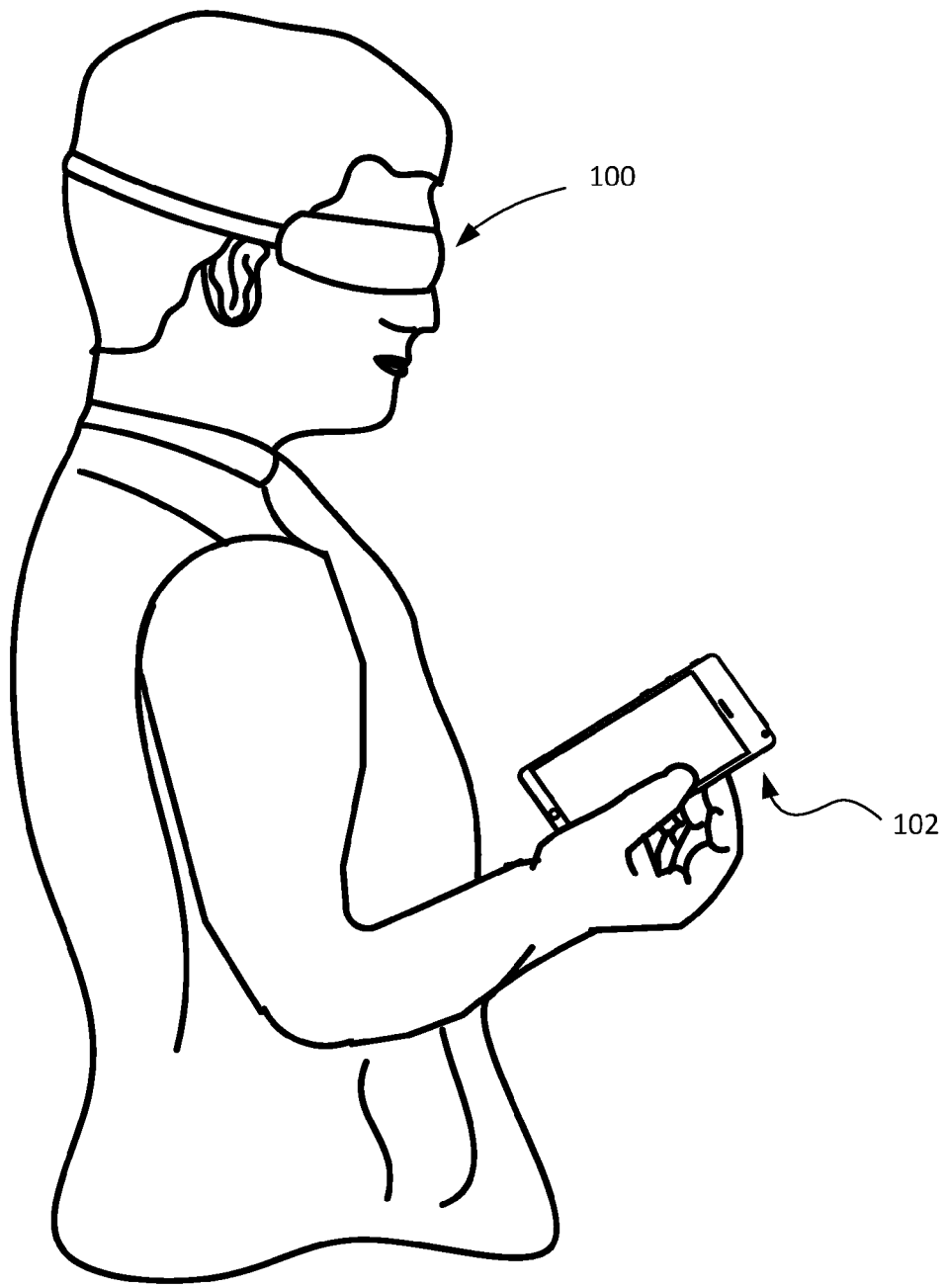
FIG. 1 is an example of a virtual reality system including a virtual reality headset and a controller according to an example implementation.

According to an illustrative example implementation, virtual reality (VR), which may also be referred to as immersive multimedia or computer-simulated life, may, at least in some cases, replicate or simulate, to varying degrees, an environment or physical presence in places in the real world or imagined worlds or environments. In an example implementation, a VR system may include a VR headset or head mounted display (HMD) device that may be mounted or worn on a user's head.

A virtual reality (VR) system may generate a three-dimensional (3D) immersive virtual environment. A user may experience this 3D immersive virtual environment through interaction with various electronic devices. For example, a helmet or other head mounted device including a display, glasses or goggles that a user looks through when viewing a display device may provide audio and visual elements of the 3D immersive virtual environment to be experienced by a user. A controller, such as, for example, external handheld devices, gloves fitted with sensors, and other such electronic devices, may be paired with the head mounted device, allowing the user to move through and interact with elements in the virtual environment through manipulation of the controller.

A user immersed in a 3D virtual environment wearing a first electronic device, for example, a HMD device/VR headset may explore the 3D virtual environment and interact with the 3D virtual environment through various different types of inputs. These inputs may include, for example, physical interaction including, for example, manipulation of a second electronic device (such as a VR controller) separate from the VR headset, manipulation of the VR headset itself, manipulation of the controller, and/or through hand/arm gestures, head movement and/or head and/or eye directional gaze and the like. The first and second electronic devices (e.g., the VR headset and the VR controller) may be operably coupled, or paired, to facilitate communication and data exchange between them.

A tracking device may track the pose of the VR headset or user's head. Pose, may include, for example, position (also referred to as location) and/or orientation for any object (physical or virtual), such as a VR controller (as an example). Pose may include, for example, absolute or relative position or location, and/or orientation of an object within a physical world, or a position/location and/or orientation of an object (e.g., virtual object or rendered element) within a virtual world. A VR controller or any object may have six degrees of freedom (6 DoF) to move in a 3-dimensional space. Specifically, a controller or object may be free to change position as forward/backward (surge), up/down (heave), left/right (sway) translation in three perpendicular axes, combined with changes in orientation through rotation about three perpendicular axes, often termed pitch, yaw, and roll.

Thus, according to an example implementation, an object's location (or position) in 3-dimensional (3D) space may be defined by its position on three orthogonal (or perpendicular) axes (e.g., X axis, Y axis, Z axis). Therefore, an object's location (or position) may be identified by 3D coordinates, e.g., X, Y and Z coordinates. Also, an object can be rotated about the three orthogonal axes. These rotations may be referred to as pitch, yaw and roll. The pitch, yaw and roll rotations can define an orientation of any object. Thus, for example, orientation of an object may include or may refer to a direction that an object is pointed or oriented towards.

According to an example implementation, head pose information may include information indicating (or identifying) a head pose, and may include at least one (or may alternatively include both) of location information indicating a location of a user's head or of a virtual reality headset worn by a user and orientation information indicating an orientation of the user's head or of the virtual reality headset. For example, head pose information (e.g., including location information and/or orientation information of the user's head or VR headset worn by the user) may be received from a tracking device (e.g., which may be part of the VR headset) that tracks a pose of the virtual reality headset worn by a user.

Similarly, object pose information may include information indicating (identifying) an object pose, e.g., including at least one (or may alternatively include both) of location information indicating a location (or position) of the object and orientation information indicating an orientation of the object. For example, an object may include a physical object, such as a VR controller operated by a user. Object pose information, at least in some cases, may be received from a tracking device that tracks a pose (location and/or orientation) of the object.

An object may also include a virtual object (e.g., a sword or light sabre, or an animal) that is rendered and then displayed in the virtual world on a display of a HMD or VR headset. For example, a virtual object (motion and/or pose of the virtual object) may be controlled by a VR controller or other physical object. The object pose information (e.g., from a VR controller or other physical object) may, for example, be used by a VR application (or other application or program) to change the pose (e.g., location and/or orientation) of one or more virtual objects (or rendered elements) within an image or frame displayed in the virtual world.

Also, motion and/or a pose of a virtual object (e.g., a spaceship, an animal, a spaceship or rocket lifting off) may be controlled by a VR application. Also, the VR application may, or may not, receive pose information for the virtual object from a VR controller or other physical object. Thus, for example, in a case where pose information is received from a VR controller or other physical object that is associated with (e.g., controls motion and/or pose of) the virtual object (e.g., VR controller in physical world to control motion or pose of a sword or light sabre in the virtual world), the VR application and the pose information of the VR controller or object may both be used (e.g., by the VR application) to control motion and/or pose of the virtual object.

A graphics engine may be used to render graphics of the VR content for display based on a current pose of the VR headset or user's head. Rendering may include a process of generating an image, such as, for example, rendering an image from a 2D (2 dimensional) or 3D (3 dimensional) model by a computer program or software that is run by a processor. In some cases, while the graphics engine is rendering graphics for a frame, a user's head or VR headset may move, causing the location/orientation information for the user's head to be inaccurate by the time the frame is output to the display. Time-warping may be used to warp (e.g., rotate or adjust) an image or frame to correct for head motion that occurred after (or while) the scene was rendered and thereby reduce perceived latency. For example, a homograph warp may use homography transformation of the image to rotate the image based on post-rendering pose information. Time-warp may include a synchronous time-warp or an asynchronous time-warp.

However, the time-warping process becomes more difficult when a VR controller (e.g., handheld VR controller or other moving object, physical or virtual) is added to the VR system. In particular, the VR headset/user's head and the VR controller may typically move independently. Therefore, a VR system that includes both a VR headset (or HMD) and a VR controller, may have poor VR performance when performing time-warping for a VR scene or frame based only on an updated pose of the VR headset, as this may result in an incorrect location being provided for the VR controller (e.g., such as in the case where VR headset/user's head is moving one direction, and the VR controller may be moving the opposite direction).

Therefore, according to an example implementation, a separate processing pipeline may be provided for each of the VR headset and the VR controller (or object), where the processing pipeline may include, for example, a graphics engine and an electronic display stabilization (EDS) engine to perform time-warping. For example, in a first processing pipeline, a first graphics engine may render a main scene based on head pose information for a VR headset. A first EDS engine may perform time-warping for a main scene of VR content based on an updated head pose information. In a second processing pipeline, a second graphics engine (which may be the same or different than the first graphics engine) may render a graphical overlay for the VR controller (or other object, or rendered element). A second EDS engine may perform time-warping for a graphical overlay for the VR controller (or other object) based on an updated pose information for the VR controller/object. Thus, the time-warping for the graphical overlay for the VR controller/object may be performed separately from the time-warping for the main scene. The time-warped main scene and the time-warped graphical overlay for the VR controller/object may be composited and then output for display. Separation in the aforementioned sense can mean, for example, that the first and the second processing pipelines may be operated as different programs (or via different subroutine calls, or performed as different calculations by a program), and/or on different threads and/or processors, with (at least partially) different data, and/or in parallel, where the computation of one pipeline may occur simultaneously with the respective other pipeline.

In this manner, the independent motion of the VR headset and the VR controller/object may be accommodated by separately time-warping the main scene and graphical overlay based on their respective updated pose information. The time-warping for the VR headset and the VR controller/object may be performed in a separate processing pipeline.

These techniques may be expanded to separately or independently time-warp graphical overlays for multiple VR controllers or for multiple physical or virtual objects, e.g., based on the separate updated pose information (e.g., location and/or orientation) for each controller or object. In the case of performing time-warping of a graphical overlay associated with a VR controller or a physical object, a tracking device (e.g., IMU, accelerometer, camera or other tracking device) may be used to provide a current and then an updated pose information to be used for time-warping the corresponding graphical overlay. In the case of performing time-warping of a graphical overlay for a virtual object or a rendered element in the scene or frame, a VR application may provide updated pose information to the EDS engine to allow time-warping to be performed for such virtual object or rendered element.

FIG. 1 is an example implementation of a virtual reality (VR) system including a head mounted display/virtual reality headset and a controller, in accordance with example implementations. In the example implementation shown in FIG. 1, a user wearing a VR headset 100 (also referred to as a HMD) is holding a portable controller 102 (which may also be referred to herein as a VR controller). The controller 102 may be, for example, a game controller, a smartphone, a joystick, or another portable electronic device that may be operably coupled to, or paired with, and communicate with, the VR headset 100. During operation (after pairing) the controller 102 may communicate with the VR headset 100 via, for example, a wired connection, or a wireless connection such as, for example, a WiFi or Bluetooth connection, or other communication mode available to both devices to exchange information and facilitate the translation of a user input at the controller 102 into a corresponding interaction in the immersive virtual environment generated by the VR headset 100.

Figure 2A:
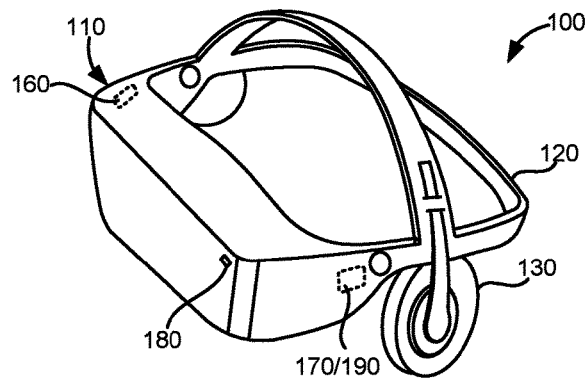
FIGS. 2A and 2B are perspective views of an example virtual reality headset according to an example implementation.
Figure 2B:
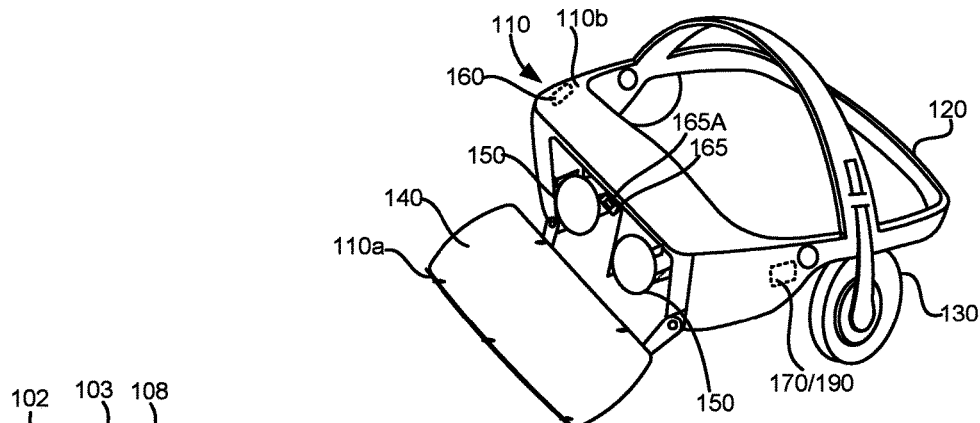
Figure 2C:
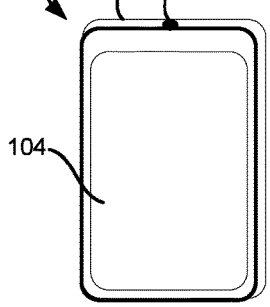
FIG. 2C illustrates a controller according to an example implementation.
Figure 3:
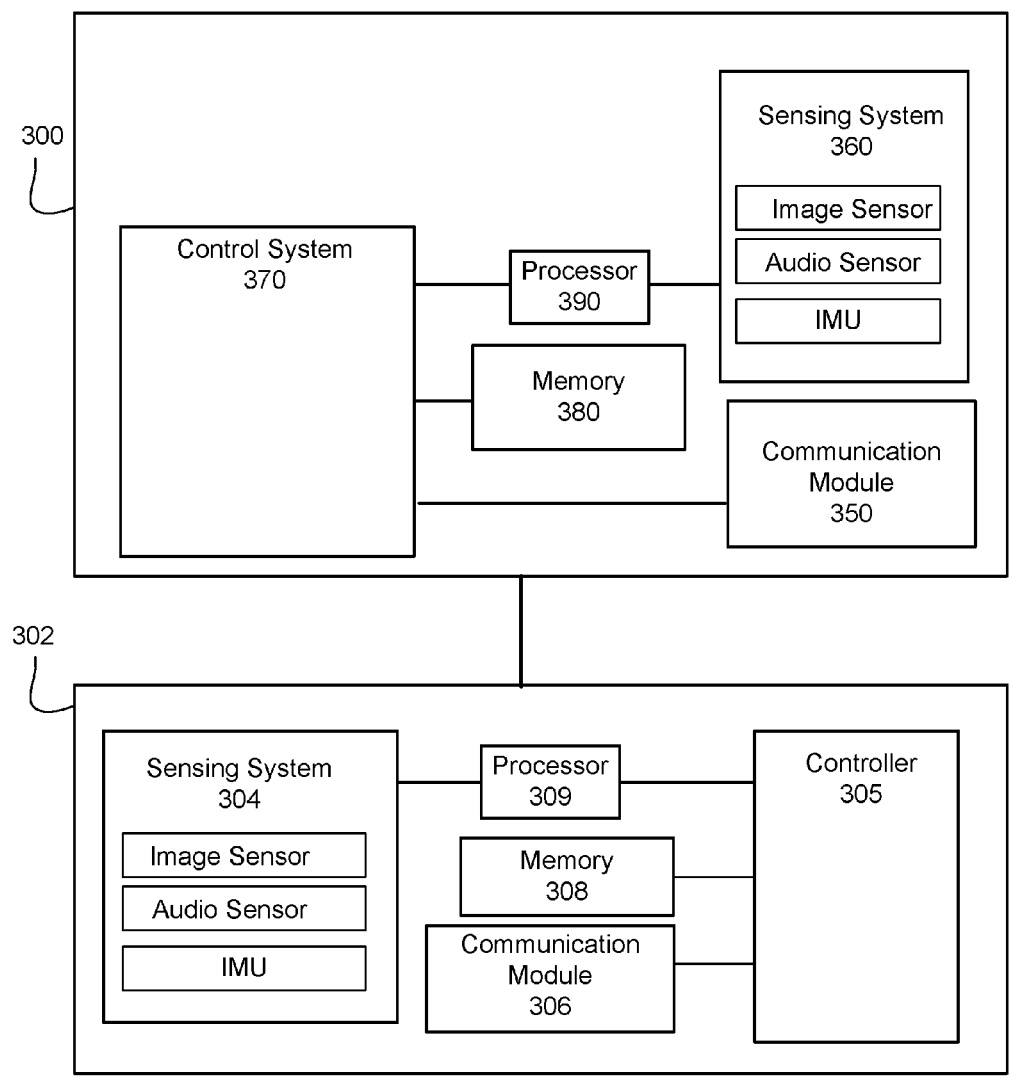
FIG. 3 is a block diagram of a head mounted electronic device and a controller according to an example implementation.

FIGS. 2A and 2B are perspective views of an example VR headset, such as, for example, the VR headset (or HMD) 100 worn by the user in FIG. 1. FIG. 2C illustrates an example controller, such as, for example, the controller 102 shown in FIG. 1. FIG. 3 is a block diagram of a virtual reality (VR) system including a first electronic device 300 in communication with a second electronic device 302 according to an example implementation. The first electronic device 300 may be, for example an a VR headset (or HMD) as shown in FIGS. 1, 2A and 2B, generating an immersive virtual environment, and the second electronic device 302 may be, for example, a controller as shown in FIGS. 1 and 2A. As noted above, the first electronic device 300 and the second electronic device 302 may be paired to establish communication between the devices and facilitate user interaction with the immersive virtual environment.

The controller 102 may include a housing 103 in which internal components of the device 102 are received, and a user interface 104 on an outside of the housing 103, accessible to the user. The user interface 104 may include a plurality of different types of manipulation devices (not shown in FIG. 2C) including, for example, touch sensitive surface(s) configured to receive user touch inputs, buttons, knobs, joysticks, toggles, slides and other such manipulation devices. In some implementations, the controller 102 may also include a light source 108 configured to selectively emit light, for example, a beam or ray, through a port in the housing 103, for example, in response to a user input received at the user interface 104.

The VR headset 100 may include a housing 110 coupled to a frame 120, with an audio output device 130 including, for example, speakers mounted in headphones, also be coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the VR headset 100 may include a sensing system 160 including various sensors such as, for example, audio sensor(s), image/light sensor(s), positional sensors/tracking device (e.g., inertial measurement unit including gyroscope and accelerometer), camera(s), and the like. The VR headset 100 may also include a control system 170 including a processor 190 and various control system devices to facilitate operation of the VR headset 100.

In some implementations, the VR headset 100 may include a camera 180 to capture still and moving images. The images captured by the camera 180 may be used to help track a physical position (e.g., position/location and/or orientation) of the user and/or the controller 102 in the real world, or physical environment relative to the virtual environment, and/or may be displayed to the user on the display 140 in a pass through mode, allowing the user to temporarily leave the virtual environment and return to the physical environment without removing the VR headset 100 or otherwise changing the configuration of the VR headset 100 to move the housing 110 out of the line of sight of the user.

In some implementations, the VR headset 100 may include a gaze tracking device 165 to detect and track an eye gaze of the user. The gaze tracking device 165 may include, for example, an image sensor 165A, or multiple image sensors 165A, to capture images of the user's eyes, for example, a particular portion of the user's eyes, such as, for example, the pupil, to detect, and track direction and movement of, the user's gaze. In some implementations, the VR headset 100 may be configured so that the detected gaze is processed as a user input to be translated into a corresponding interaction in the immersive virtual experience.

The first electronic device 300 may include a sensing system 360 and a control system 370, which may be similar to the sensing system 160 and the control system 170, respectively, shown in FIGS. 2A and 2B. The sensing system 360 may include one or more different types of sensors, including, for example, a light sensor, an audio sensor, an image sensor, a distance/proximity sensor, a positional sensor (e.g., an inertial measurement unit including a gyroscope and accelerometer), a camera, and/or other sensors and/or different combination(s) of sensors, including, for example, an image sensor positioned to detect and track the user's eye gaze, such as the gaze tracking device 165 shown in FIG. 2B. The first electronic device 300 may include, for example, a tracking device (to determine or track pose information for a physical object or VR controller) which may include, for example, an inertial measurement unit (IMU), an accelerometer, optical detector, or camera or other sensor/device to detect location or orientation. Thus, the tracking device may provide pose information, for example, in the case where a pose (e.g., location and/or orientation) of a physical object or VR controller may be controlled, at least in part, by the VR controller or a user operating or moving a VR controller, for example. Also, the first electronic device 300 may also receive pose information (e.g., location and/or orientation) for a virtual object or rendered element, e.g., where movement and/or a pose (including location and/or orientation) of such virtual object may be, at least partially, under control of a VR application, for example. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD/VR headset other than the VR headset 100 shown in FIGS. 2A and 2B. The first electronic device 300 may also include a processor 390 in communication with the sensing system 360 and the control system 370, a memory 380, and a communication module 350 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300. In addition to providing for the exchange of data between the first electronic device 300 and the second electronic device 302, the communication module 306 may also be configured to emit a ray or beam as described above. The second electronic device 302 may include a sensing system 304 including an image sensor and an audio sensor, such as is included in, for example, a camera and microphone, a tracking device (to determine or track pose information) which may include, for example, an inertial measurement unit (IMU), an accelerometer, optical detector, or camera or other sensor/device to detect location or orientation, a touch sensor such as is included in a touch sensitive surface of a controller, or smartphone, and other such sensors and/or different combination(s) of sensors. A processor 309 may be in communication with the sensing system 304 and a control unit 305 of the second electronic device 302, the control unit 305 having access to a memory 308 and controlling overall operation of the second electronic device 302.

The VR headset may include, for example, a network interface to receive VR content via a network and/or to communicate with a VR controller or other object, a processor, a memory, a display, one or more graphics engines to render a scene or a graphical overlay, a tracking device for the headset that may include an IMU, one or more accelerometer (s), sensors, detectors, cameras or other devices that may measure and/or indicate a pose (e.g., location and/or orientation) of the user's head or the VR headset. The VR headset of the VR system may also include one or more electronic display stabilization (EDS) engines to perform time-warping on a scene, image or graphical overlay based on pose information (e.g., location and/or orientation) of the headset, the user's head, a VR controller or other object. The graphics engine may render a scene (or image) based on information received from a VR application and based on a current pose (e.g., location and/or orientation) of a user's head or VR headset.

Time-warp is a technique that warps (e.g., adjusts or rotates) a rendered image before sending it to the display in order to correct for motion (e.g., head motion) that occurred after the scene was rendered and thereby reduce the perceived latency. By time-warping (e.g., rotate or adjust) an image or frame to correct for head motion that occurred after (or while) the scene was rendered, perceived latency may be reduced. In other words, time-warp achieves, for example, a more timely and closer correspondence between real-world movements, e.g. of an object or movement of the user's head, and a display rendered and shown in an HMD or VR headset. For example, a homograph warp may use homography transformation of the image to rotate the image based on post-rendering pose information. Time-warp may include a synchronous time-warp or an asynchronous time-warp. A basic or example implementation of time-warp may include an orientation-only time-warp, in which only the rotational change in the head pose (or object pose, or other pose) is corrected for. An orientation-only time-warp may, for example, include an advantage of being a 2D (two-dimensional) warp, which is computationally less expensive. For reasonably complex scenes, this can be done with much less computation than rendering a whole new frame. In synchronous time-warp, the computation may be performed by a rendering thread. Asynchronous time-warp refers to doing this on another thread in parallel (i.e., asynchronously) with rendering. For example, an ATW (asynchronous time-warp) thread may generate a new time-warped frame from the latest frame completed by the rendering thread. One or more of these techniques may be used for time-warping. An advantage of ATW is that the rendering thread is not delayed by the computation involved in the time-warp, and furthermore that multiprocessing capabilities of an underlying software and/or hardware platform can be exploited.

In some cases, while the graphics engine is rendering graphics (or a scene) for a frame, a user's head or VR headset may move, causing the pose (e.g., location/orientation) information for the user's head to be inaccurate by the time the frame is output to the display. Therefore, according to an example implementation, an EDS engine may be used to perform time-warping on an image or frame to correct for head motion that occurred after the scene was rendered (or while the scene was being rendered) based on updated head pose information, and thereby rotate or adjust the rendered image based on more accurate/updated head pose information, and reduce perceived latency.

In an example implementation, the VR system may also include one or more VR controllers or other physical objects whose pose (e.g., location and/or orientation) may be tracked and then the controller and/or a virtual object and/or user's hand may be displayed within the rendered image of the VR content. The VR controller may include a tracking device (which may include an IMU or other sensor device) to measure and then transmit, via wireless communication, the pose (e.g., location and/or orientation) of the VR controller or object to the processor within the VR headset, for example. Also, a displayed scene/image/frame of the VR content may be adjusted or updated based on the pose (e.g., location/orientation) of the VR controller or object. According to an illustrative example implementation, a VR controller may be held (or operated by) one or both hands of the user of the VR system, such as a left controller (e.g., for the left hand), and a right controller (e.g., for the right hand). Alternatively, only a single controller may be provided. A pose (e.g., location and/or orientation) of other physical objects (e.g., a soccer ball, hockey puck, a basketball, a football or other object) may also be tracked by a tracking device (e.g., IMU) within the object, and such pose may be transmitted to the user's VR headset via wireless communications. Also, a pose of a virtual object or rendered element may be tracked by a VR application that generates or receives VR content for display.

Thus, an object may include a physical object (such as a VR controller, a ball, or other physical object) or a virtual object. According to an example implementation, pose (location and/or orientation) of a physical object may be provided or reported by a tracking device within (or associated with) the object (e.g., within the VR controller or within the physical soccer ball). A virtual object may be an object that exists in the VR world or VR environment and is displayed to the user, an may not necessarily exist in the real world or real environment. Because, for example, movement and pose of a virtual object may, for example, be under control of the VR application, the VR application may know and be able to provide a pose of the virtual object at any instant. Thus, for example, a pose (e.g., location and/or orientation) of a virtual object may be provided or reported by the VR application. For example, a rocket (as a virtual object that is presented in the virtual world or VR content, but is not necessarily in the real world) that is taking off, may move (in the virtual world) under control of a VR application. Thus, the VR application may report pose information at various time instants for this rocket and/or other virtual objects.

According to various examples, the VR controller may be used or operated by a user of the VR system to actuate, move, operate, or otherwise control one or more objects that may be displayed on a display device of the VR headset as part of the VR content. As some illustrative examples, a VR controller may control a (virtual) sword, a virtual light sabre, a virtual baseball bat (e.g., used in virtual batting practice to hit a virtual baseball/softball), a virtual golf club (e.g., used to hit a golf ball/virtual golf ball), a virtual tennis racket (e.g., to hit a virtual tennis ball), etc. For example, during a virtual fight, the user of the VR system may swing the VR controller in different directions to move or swing a virtual sword, where an image of the moving sword and the user's hand(s), for example, may appear within one or more images/scenes/frames rendered and displayed to the user on a display device of the VR headset. Or, in another example, the user may swing a VR controller to swing a virtual golf club, where an image of the golf club and the user's hand(s) may appear within one or more images/scenes/frames rendered and displayed to the user on a display device of the VR headset. Therefore, according to an example implementation, the user's head (or VR headset) and one or more VR controllers (or other objects to be tracked) may move independently.

A graphics engine, e.g., within (or as part of) the VR headset or within the VR controller, may be used to render a portion of an image or frame for (or associated with) the VR controller, where such image portion for the VR controller may be a graphical image of, for example, a sword, a golf club, the user's hands, etc., which may be displayed on the display device of the VR headset. While the graphics engine of the VR headset is rendering graphics of a portion of the display for the VR controller (e.g., while the graphics engine is rendering the sword or tennis racket and the user's hands to be displayed), the user's hands and VR controller may move, causing the pose (e.g., location/orientation) information for the VR controller to be inaccurate by the time the frame is output to the display, which can cause the portion of the image (e.g., controller or sword and user's hands) for (or associated with or controlled by) the VR controller to be displayed on the frame/scene at the wrong location, causing latency and a poor user VR experience.

Unfortunately, due to the independent motion of the user's head/VR headset and each of the VR controllers (or other objects that may be tracked and/or displayed on the VR headset), performing time-warping for the image/scene based only on an updated pose of the user's head/VR headset will not typically correctly adjust such scene/image/frame for the updated pose of the VR controller or user's hands, for example, due to the independent motion. Thus, if the user's head is moving to the left, and the VR controller (or user's hands) are moving to the right, then performing time-warping on all or part of the image/scene/frame based on an updated pose of the VR headset/user's head will not correctly adjust or correct the location of the graphical overlay, because the VR headset/user's head and the VR controller are moving in different directions.

Therefore, according to an example implementation, various techniques may be provided to allow the pose of a VR controller to be accurately reflected/displayed on a displayed image or scene based on the movement or pose of the VR controller, independently from the motion or pose of the user's head or the VR headset.

For example, a first video rendering and time-warping, within a first processing pipeline, may be performed for a main scene of virtual reality content based on an updated head pose information. And, a second video rendering and time-warping, within a second processing pipeline, of a graphical overlay for a virtual reality controller (or other object) may be performed based on updated controller pose (e.g., location and/or orientation) information of the VR controller. Therefore, by separately and/or independently performing time-warping for a main scene based on head pose information and a graphical overlay for or associated with a VR controller based on VR controller pose information, this may allow a more accurate display of both the main scene and the VR controller (or a graphical overlay for the VR controller) to be displayed to the user.

Figure 4:
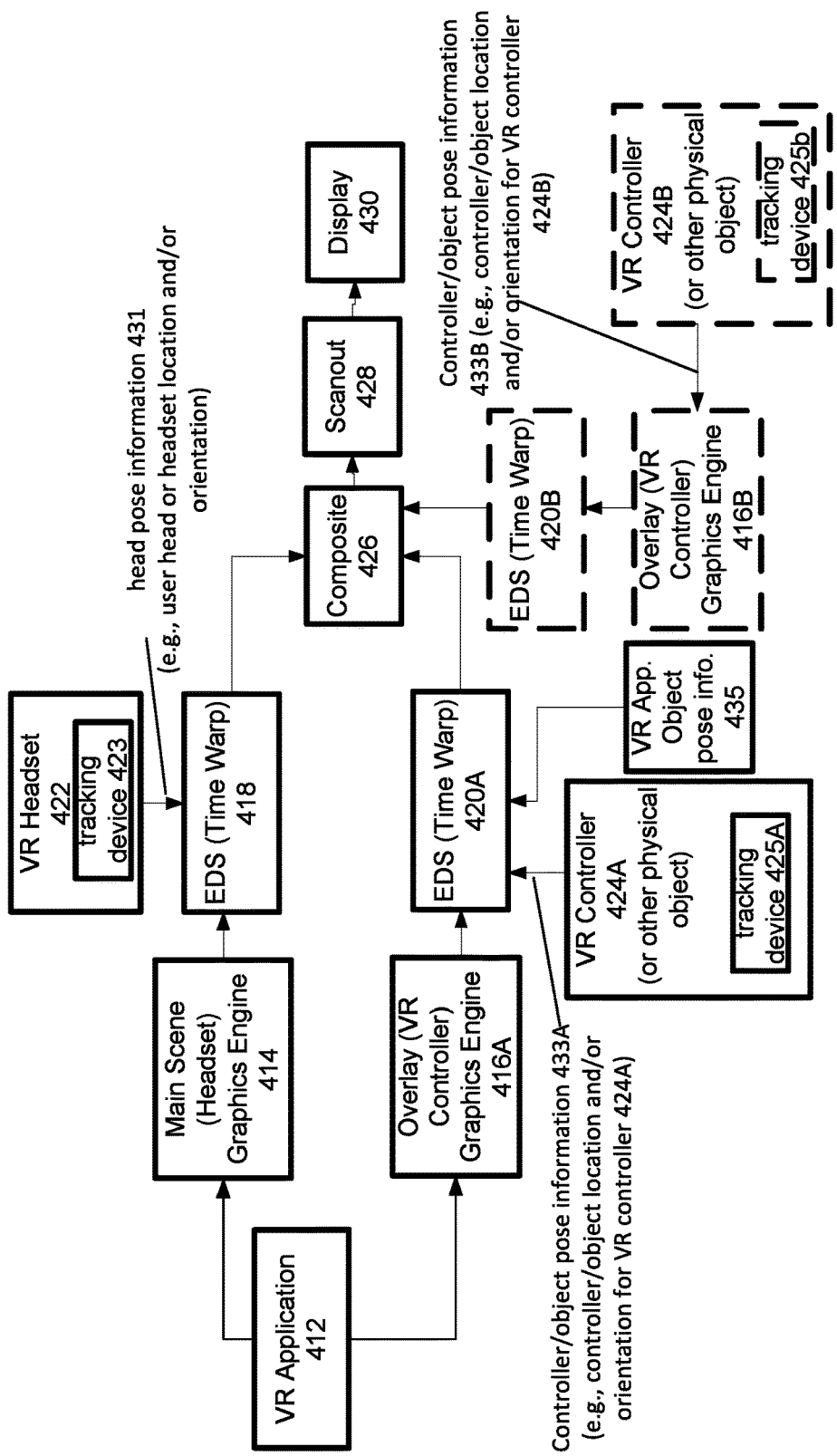
FIG. 4 is a block diagram illustrating a virtual reality system according to an example implementation.

FIG. 4 is a block diagram illustrating a virtual reality system according to an example implementation. A virtual reality (VR) application 412 may generate and/or receive (via a network, for example) virtual reality content. VR headset 422 may be worn on a user's head, and thus, the pose of the user's head may move with the pose of the VR headset 422. The VR headset 422 may include a processor, a memory, a network/wireless interface (not shown) for communicating over a network, such as over a wireless local area network (WLAN) network, for example, and a display device 430 for displaying images/scenes/frames.

VR headset 422 may also include a tracking device 423, e.g., for measuring and/or determining a pose of the user's head and/or pose of the VR headset 422. Tracking device 423 may include, for example, an inertial measurement unit (IMU), accelerometers, optical detectors, cameras or other devices to detect or sense the pose (e.g., location and/or orientation) of the user' head or of VR headset 122. VR headset 422 may include one or more graphics engines, such as graphics engine 414, associated with a VR headset 422, for rendering a main scene of the virtual-reality content based on a current head pose information for a user's head or based on pose information for the virtual-reality headset 422, and a graphics engine 416A for rendering a graphical overlay for VR controller 424A (e.g., rendering, depicting or displaying the VR controller 424A, the user's hand(s), or an object, e.g., bat, sword, golf club, etc., controlled by the VR controller 424A, for example) based on current pose information (e.g., location and/or orientation) of VR controller 424A. Graphics engine 414 may receive head pose information from tracking device 423 of VR headset 422. Graphics engine 416A may receive pose information for controller 424A from tracking device 425A of VR controller 424A.

As noted, in some cases, while a graphics engine is rendering graphics (or a scene) for a frame, a user's head/VR headset 422 or the VR controller 424A may move, causing the pose (e.g., location/orientation) information for the user's head and/or VR controller 424A to be inaccurate by the time the frame is output to the display. The motion/movement of the user's head/VR headset 422 and VR controller 424A may be independent.

Therefore, according to an example implementation, in order to compensate for the independent motion of the user's head/VR headset 422 and the VR controller 424A, the VR system shown in FIG. 4 may include separate processing pipelines for 1) the main scene for VR headset 422 and 2) the graphical overlay for controller 424A. For example, a first processing pipeline for a main scene for the VR headset 422 may include graphics engine 414 and EDS engine 418, and a second processing pipeline may include graphics engine 416A and EDS engine 420A, e.g., to separately determine and apply a time-warp for the main scene for VR headset 422 and the graphical overlay for the VR controller 424A, due to the independent motion of the user's head/VR headset 422 and VR controller 424A.

Therefore, according to an example implementation, an EDS engine 418 may perform time-warping on a main scene received from graphics engine 414 based on updated head pose information 431 received from tracking device 123 of VR headset 422. Also, according to an example implementation, in a separate processing pipeline, EDS engine 120A may perform time-warping on a graphical overlay for the controller 424A received from graphics engine 416A based on updated pose information 433A for controller 424A received from tracking device 425A of VR controller 424A. In this manner, according to an example implementation, separate and/or independent time-warp adjustments may be applied to the main scene and the graphical overlay for the VR controller 424A based on their respective (separate) updated pose information. In another example implementation, VR application object pose information 435 (e.g., where VR application 412 may indicate, at least in part, a pose, or location or orientation, or portion thereof) of the VR controller 424A or other object, such as a physical object or virtual object) may also be used by EDS 420A to perform time-warping on the graphical image. Thus, for example, object pose information 435, provided by a VR application 412, may include pose information (e.g., location information and/or orientation information) of a virtual object that may be rendered and displayed on a HMD or VR headset, for example.

Also, according to an example implementation, time-warping on the graphical overlay for controller 424A may be performed based on both updated head pose information 431 from VR headset 422 and updated pose information 433A for controller 424A. This is because, for example, the perceived pose (location and orientation) of the VR controller 424A, as perceived or seen by the user of the VR headset 422, may be a combination (or based on both) of the movement (or change in pose) for both the VR headset and the VR controller 424A. Thus, the time-warping for the VR controller 424A (or other physical object) may be based on the updated pose information for the VR headset (updated head pose) and updated pose information for the VR controller or object. A similar process may be performed for a virtual object, where time-warping for a virtual object may be performed based on both updated pose information for the virtual object (e.g., pose information of the virtual object received from a VR application that generates and controls such virtual object) and the updated pose information for the VR headset.

A composite block 426 of VR headset 422 may generate a composite image based on the time-warped main scene/image received from EDS engine 418 and the time-warped object or the time-warped graphical overlay for controller 424A received from EDS engine 420A. Composite block 426 may also generate a composite image based on an additional objects or time-warped graphical overlays, for one or more physical objects or virtual objects, received from other EDS engines. The graphical overlay (or rendered and displayed virtual object) may be alpha-masked to remove all of the image except the overlay portion (e.g., portion of image depicting the object, such as user's hands, VR controller, or objects (sword, bat, golf club, . . . ) controlled by the VR controller for display) for the controller (or object) to be overlaid on the main scene. For example, rather than removing only the desired pixels of the element (or object) to be displayed or overlayed, it may be simpler to copy one or more square or rectangular blocks around (or that includes) the element to generate the graphical overlay for the controller or object, and omit the remainder of the graphics. One or more graphical overlays may be composited or overlayed on the main scene by composite block 426 to generate the composite image. The composite image is then provided to scanout block 428, where the composite image (or frame) is then output, or scanned out, to a display device 430 of the VR headset 422 for display to the user.

While only one VR controller (VR controller 424A) has been described in some of the illustrative examples above, the VR system may include multiple VR controllers (and/or multiple physical objects that may be tracked), and a separate processing pipeline (including at least an EDS engine) may be provided for each VR controller (and/or for each physical object or virtual object), in addition to the processing pipeline for the main scene/VR headset 422. For example, as a second controller, a VR controller 424B, may be provided, and may include tracking device 425B to determine the current and updated pose of VR controller 424B, a graphics engine 416B for rendering a graphical overlay for VR controller 424B based on a current pose of VR controller 424B, and an EDS engine 420B for performing time-warping on the graphical overlay for the VR controller 424B based on updated pose information of VR controller 424B received from tracking device 425B, for example.

Many of the illustrative examples above have been described with respect to a VR controller (e.g., 424A and/or 424B). However, the techniques described herein may be applied to any moving (virtual or physical) object (e.g., a baseball, soccer ball, a person, a moving vehicle/car, or other object, thing or person). For example, a ball (or other physical object) may include (e.g., inside the ball) a tracking device to record a pose (e.g., location and/or orientation) of the ball and a wireless transceiver to periodically transmit the pose information for the ball to the VR headset 422. A pose (location and/or orientation) of a virtual object (to be displayed on a HMD or VR headset), associated with or under the control of the physical object, may be the same as or based upon the pose of the associated physical object. For example, a location and orientation of a light sabre (an example virtual object) displayed as a virtual object on a display of a HMD or VR headset may be the same as (or may be based upon) a pose of the VR controller that may be used by a user to control the motion or pose of the displayed sword or light sabre. Similarly, pose (location and/or orientation) information for a virtual object (or rendered element) may be provided, e.g., by VR application 412, to an EDS engine for performing time-warping on the virtual object or a graphical overlay for such virtual object/rendered element. See, for example, VR application position (or pose) information 435, FIG. 4. A separate processing pipeline may be provided for the ball (an example object) within the VR system or within the VR headset 422, e.g., including one or more of a graphics engine to render a graphical overlay for the ball based on a pre-rendering/current pose of the ball and an EDS engine to perform time-warping of the graphical overlay for the ball based on an updated pose for the ball. The time-warped graphical overlay for the ball may be overlayed on or composited with a main scene (and possibly one or more other overlays) to generate a composite image for display. Likewise, according to an example implementation, a separate processing pipeline may be provided for a virtual object (or for each virtual object). For example, the processing pipeline for the virtual object may include, for example, a graphics engine to render a graphical overlay for the virtual object based on a pre-rendering/current pose of the virtual object, and an EDS engine to perform time-warping of the graphical overlay for the virtual based on an updated pose (e.g., provided by VR application 412) for the virtual object. The time-warped graphical overlay for the virtual object may be overlayed on or composited with a main scene (and possibly one or more other overlays) to generate a composite image for display.

In an illustrative example, a VR environment or VR content may be displayed by a HMD or VR headset for an adventure game where a user may use a sword to fight a dragon. The displayed scene may include a main scene that displays a field with trees, which is static (not moving), a sword that is controlled by (or moves under control of) a VR controller 424A (where the sword is a virtual object having a pose (location and/or orientation) that is controlled by the VR controller 424A, e.g., pose of the sword is controlled by or may be the same as the pose of the VR controller 424A), and a dragon (an illustrative example of a virtual object having a pose that is controlled by the VR application 412). A virtual object is a rendered element or object (rendered and displayed on a HMD or VR headset) that may, or may not, also be present in the physical world. For example, a first time-warping may be performed (e.g., in a first processing pipeline) for a scene based on updated head pose information (e.g., updated pose for VR headset); a second time-warping of an object, e.g., a graphical overlay for the sword (which is controlled by the VR controller) may be performed (e.g., in a second processing pipeline) based on updated pose information for the VR controller 424A (because, in this example, the sword, displayed in the virtual world, is controlled by movement of the VR controller 424A in the physical world); and a third time-warping of the dragon or a graphical overlay for the dragon (where motion or pose of the dragon is controlled by the VR application 412) may be performed (e.g., in a third processing pipeline) based on updated pose information (e.g., received from the VR application 412) for the dragon. The (e.g., independently or separately) time-warped graphical overlays for the sword (an first example virtual object under control of the VR controller 424A) and the dragon (a second example virtual object under control of the VR application 412) may be overlayed on or composited with a scene (and possibly one or more other overlays for other virtual objects) to generate a composite image for display.

In an alternative example implementation, the second time-warping of a graphical overlay for the sword may be performed based on both an updated pose information for the VR controller 424A and the updated head pose information. Likewise, in an alternative implementation, the third time-warping of a graphical overlay for the dragon may be performed based on both an updated pose information for the dragon (received from the VR application 412) and the updated head pose information. Thus, according to an example implementation, perceived motion or perceived pose (e.g., as seen or perceived by a user wearing the VR headset) of an object (e.g., sword or dragon this illustrative example) may be based on both motion or change in pose of the user/user's head (e.g., head pose) and motion or change in pose of the virtual object itself. To reflect this situation, as seen or viewed by a user, according to an example implementation, a time-warp for a virtual object may be determined or performed based on both an updated head pose and an updated object pose.

Example 1

Figure 5:
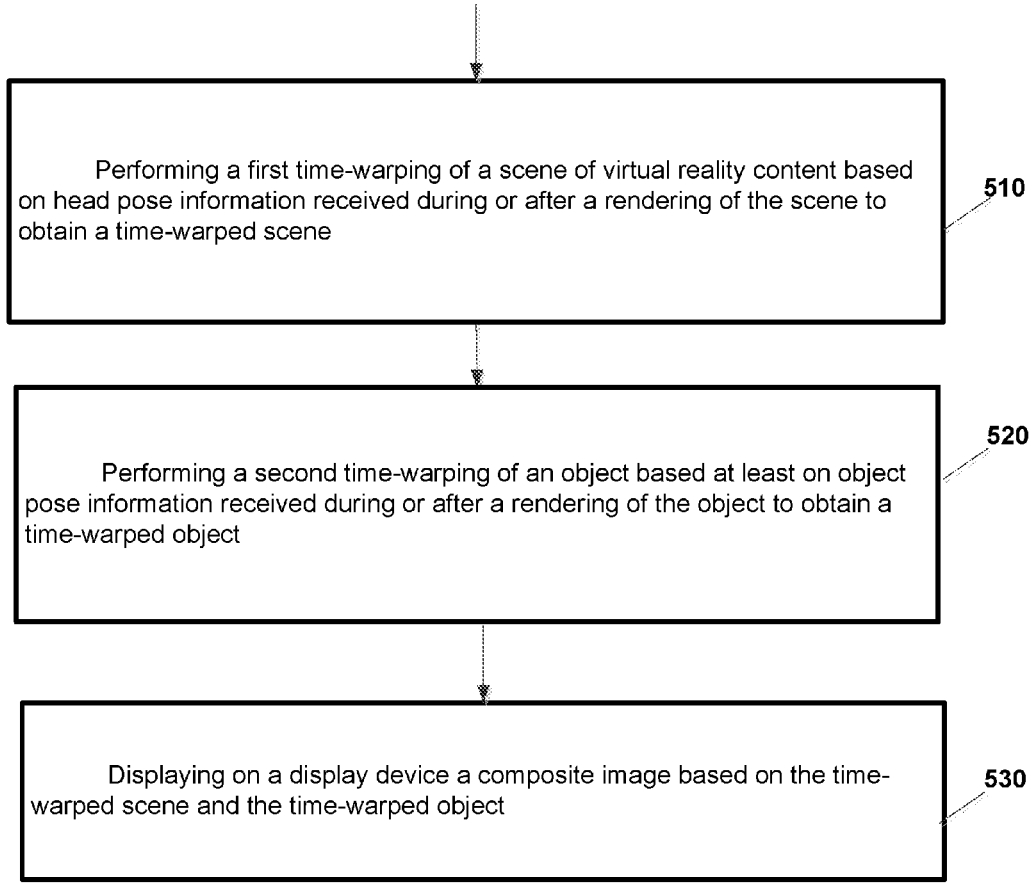
FIG. 5 is a flow chart illustrating operation of a virtual reality system according to an example implementation.

FIG. 5 is a flow chart illustrating operation of a virtual reality (VR) system according to an example implementation. Operation 510 includes performing a first time-warping of a scene of virtual reality content based on head pose information received during or after a rendering of the scene to obtain a time-warped scene. Operation 520 includes performing a second time-warping of an object based at least on object pose information received during or after a rendering of the object to obtain a time-warped object. And, operation 530 includes displaying on a display device a composite image based on the time-warped scene and the time-warped object.

Example 2

The method of example 1, wherein the head pose information includes information indicating a head pose, the head pose information comprising at least one of location information indicating a location of a user's head or of a virtual reality headset worn by a user and orientation information indicating an orientation of the user's head or of the virtual reality headset.

Example 3

The method of any of examples 1-2 wherein the head pose information comprises head pose information received from a tracking device that tracks a pose of a virtual reality headset worn by a user.

Example 4

The method of any of examples 1-3, wherein the object pose information includes information indicating an object pose, the object pose information comprising at least one of location information indicating a location of the object and orientation information indicating an orientation of the object.

Example 5

The method of any of examples 1-4, wherein the object comprises a virtual object to be displayed on the display device; and wherein the object pose information comprises at least one of location information and orientation information of the virtual object.

Example 6

The method of any of examples 1-5, wherein the object comprises a virtual object to be displayed on the display device; and wherein the object pose information comprises at least one of the following: at least one of location information and orientation information of the virtual object received from a virtual reality application; and at least one of location information and orientation information of the virtual object received from a tracking device that tracks a pose of a controller or other physical object that controls the location and orientation of the virtual object.

Example 7

The method of any of examples 1-6, further including: receiving a first head pose information; performing a rendering of the scene based on the first head pose information; and receiving a second head pose information during or after the rendering of the scene; wherein performing the first time-warping of the scene comprises at least rotating the scene based on the second head pose information to obtain the time-warped scene.

Example 8

The method of any of examples 1-7, further including: receiving a first object pose information; performing a rendering of the object based on the first object pose information; and receiving a second object pose information during or after the rendering of the object; wherein performing the second time-warping of the object comprises at least rotating the object based on the second object pose information to obtain the time-warped object.

Example 9

The method of any of examples 1-8, wherein the performing a second time-warping comprises performing a second time-warping, separate from the first time-warping, of an object based on the object pose information received during or after a rendering of the object.

Example 10

The method of any of examples 1-9, wherein the performing a first time-warping comprises performing a first time-warping, in a first processing pipeline, of a scene of virtual reality content based on the head pose information received during or after a rendering of the main scene; and wherein the performing a second time-warping comprises performing a second time-warping, separate from the first time-warping, in a second processing pipeline, of an object based on the object pose information received during or after a rendering of the object.

Example 11

The method of example 1 wherein the performing a second time-warping includes performing a second time-warping of an object based on both the head pose information and the object pose information.

Example 12

The method of any of examples 1-11 wherein the object includes a virtual object having a location and orientation that is controlled based on a location and orientation of a virtual reality controller, wherein the performing a second time-warping includes: receiving, during or after a rendering of the virtual object, object pose information from the virtual reality controller, the object pose information including pose information for the virtual reality controller; and performing a second time-warping of the virtual object that is controlled by the virtual reality controller based at least on the pose information for the virtual reality controller to obtain a time-warped virtual object.

Example 13

The method of any of examples 1-12 wherein the object includes a virtual object that is controlled by a virtual reality application, wherein the performing a second time-warping includes: receiving, during or after a rendering of the virtual object, object pose information for the virtual object from the virtual reality application; and performing a second time-warping of the virtual object that is controlled by the virtual reality application based at least on the pose information for the virtual object to obtain a time-warped virtual object.

Example 14

An apparatus includes means for performing the method of any of examples 1-13.

Example 15

An apparatus comprising a computer program product including a non-transitory computer-readable storage medium and storing executable code that, when executed by at least one data processing apparatus, is configured to cause the at least one data processing apparatus to perform a method of any of examples 1-13.

Example 16

An apparatus includes at least one processor; a memory storing instructions that, when executed by the at least one processor, cause the apparatus to: perform a first time-warping of a scene of virtual reality content based on head pose information received during or after a rendering of the scene to obtain a time-warped scene; perform a second time-warping of an object based at least on object pose information received during or after a rendering of the object to obtain a time-warped object; and display on a display device a composite image based on the time-warped scene and the time-warped object.

Example 17

The apparatus of claim 16, wherein the head pose information includes information indicating a head pose, the head pose information comprising at least one of location information indicating a location of a user's head or of a virtual reality headset worn by a user and orientation information indicating an orientation of the user's head or of the virtual reality headset.

Example 18

The apparatus of any of examples 16-17, wherein the head pose information comprises head pose information received from a tracking device that tracks a pose of a virtual reality headset worn by a user.

Example 19

The apparatus of any of examples 16-18, wherein the object pose information includes information indicating an object pose, the object pose information comprising at least one of location information indicating a location of the object and orientation information indicating an orientation of the object.

Example 20

The apparatus of any of examples 16-19, wherein the object includes a virtual object to be displayed on the display device; and wherein the object pose information includes at least one of location information and orientation information of the virtual object.

Example 21

The apparatus of any of examples 16-20, wherein the object includes a virtual object to be displayed on the display device; and wherein the object pose information includes at least one of the following: at least one of location information and orientation information of the virtual object received from a virtual reality application; and at least one of location information and orientation information of the virtual object received from a tracking device that tracks a pose of a controller or other physical object that controls the location and orientation of the virtual object.

Example 22

The apparatus of any of examples 16-21, further causing the apparatus to: receive a first head pose information; perform a rendering of the scene based on the first head pose information; and receive a second head pose information during or after the rendering of the scene; wherein causing the apparatus to perform the first time-warping of the scene comprises causing the apparatus to at least rotate the scene based on the second head pose information to obtain the time-warped scene.

Example 23

The apparatus of any of examples 16-22, further causing the apparatus to: receive a first object pose information; perform a rendering of the object based on the first object pose information; and receive a second object pose information during or after the rendering of the object; wherein causing the apparatus to perform the second time-warping of the object comprises causing the apparatus to at least rotate the object based on the second object pose information to obtain the time-warped object.

Example 24

The apparatus of any of examples 16-23, wherein causing the apparatus to perform a second time-warping includes causing the apparatus to perform a second time-warping, separate from the first time-warping, of an object based on the object pose information received during or after a rendering of the object.

Example 25

The apparatus of any of examples 16-24, wherein causing the apparatus to perform a first time-warping includes causing the apparatus to perform a first time-warping, in a first processing pipeline, of a scene of virtual reality content based on the head pose information received during or after a rendering of the main scene; and wherein causing the apparatus to perform a second time-warping includes causing the apparatus to perform a second time-warping, separate from the first time-warping, in a second processing pipeline, of an object based on the object pose information received during or after a rendering of the object.

Example 26

The apparatus of any of examples 16-25, wherein causing the apparatus to perform a second time-warping includes causing the apparatus to perform a second time-warping of an object based on both the head pose information and the object pose information.

Example 27

The apparatus of any of examples 16-26, wherein the object includes a virtual object having a location and orientation that is controlled based on a location and orientation of a virtual reality controller, wherein causing the apparatus to perform a second time-warping includes causing the apparatus to: receive, during or after a rendering of the virtual object, object pose information from the virtual reality controller, the object pose information including pose information for the virtual reality controller; and perform a second time-warping of the virtual object that is controlled by the virtual reality controller based at least on the pose information for the virtual reality controller to obtain a time-warped virtual object.

Example 28

The apparatus of any of examples 16-27, wherein the object includes a virtual object that is controlled by a virtual reality application, wherein causing the apparatus to perform a second time-warping includes causing the apparatus to: receive, during or after a rendering of the virtual object, object pose information for the virtual object from the virtual reality application; and perform a second time-warping of the virtual object that is controlled by the virtual reality application based at least on the pose information for the virtual object to obtain a time-warped virtual object.

Example 29

Figure 6:
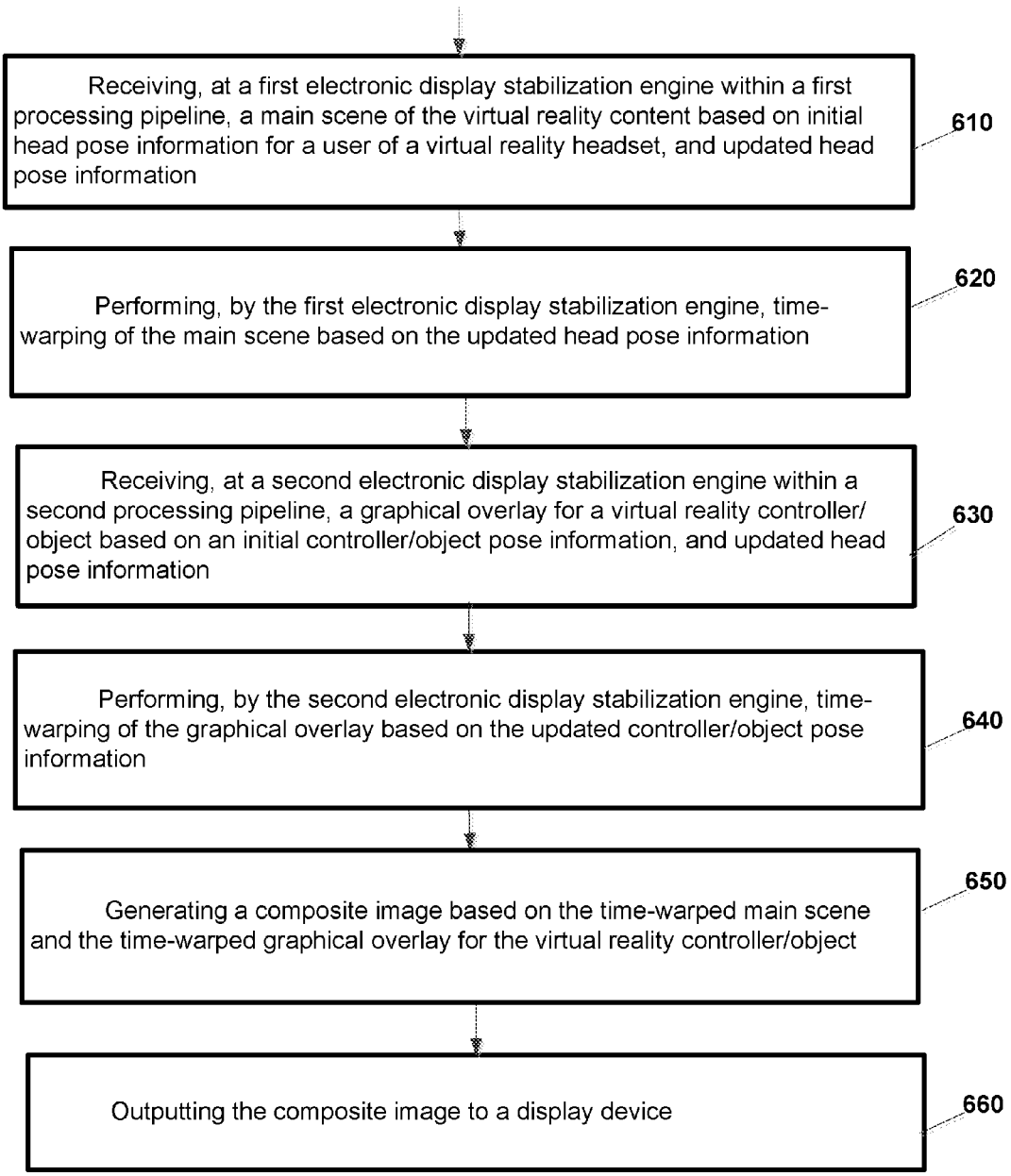
FIG. 6 is a flow chart illustrating operation of a virtual reality system according to an example implementation.

FIG. 6 is a flow chart illustrating operation of a VR system according to another example implementation. The flow chart may describe a method for rendering virtual reality content to a display device. Operation 610 includes receiving, at a first electronic display stabilization engine within a first processing pipeline, a main scene of the virtual reality content based on initial head pose information for a user of a virtual reality headset, and updated head pose information. Operation 620 includes performing, by the first electronic display stabilization engine, time-warping of the main scene based on the updated head pose information. Operation 630 includes receiving, at a second electronic display stabilization engine within a second processing pipeline, a graphical overlay for a virtual reality controller/object based on an initial controller/object pose information, and updated head pose information. Operation 640 includes performing, by the second electronic display stabilization engine, time-warping of the graphical overlay based on the updated controller/object pose information. Operation 650 includes generating a composite image based on the time-warped main scene and the time-warped graphical overlay for the virtual reality controller/object. And, operation 660 includes outputting the composite image to a display device.

Example 30

Figure 7:
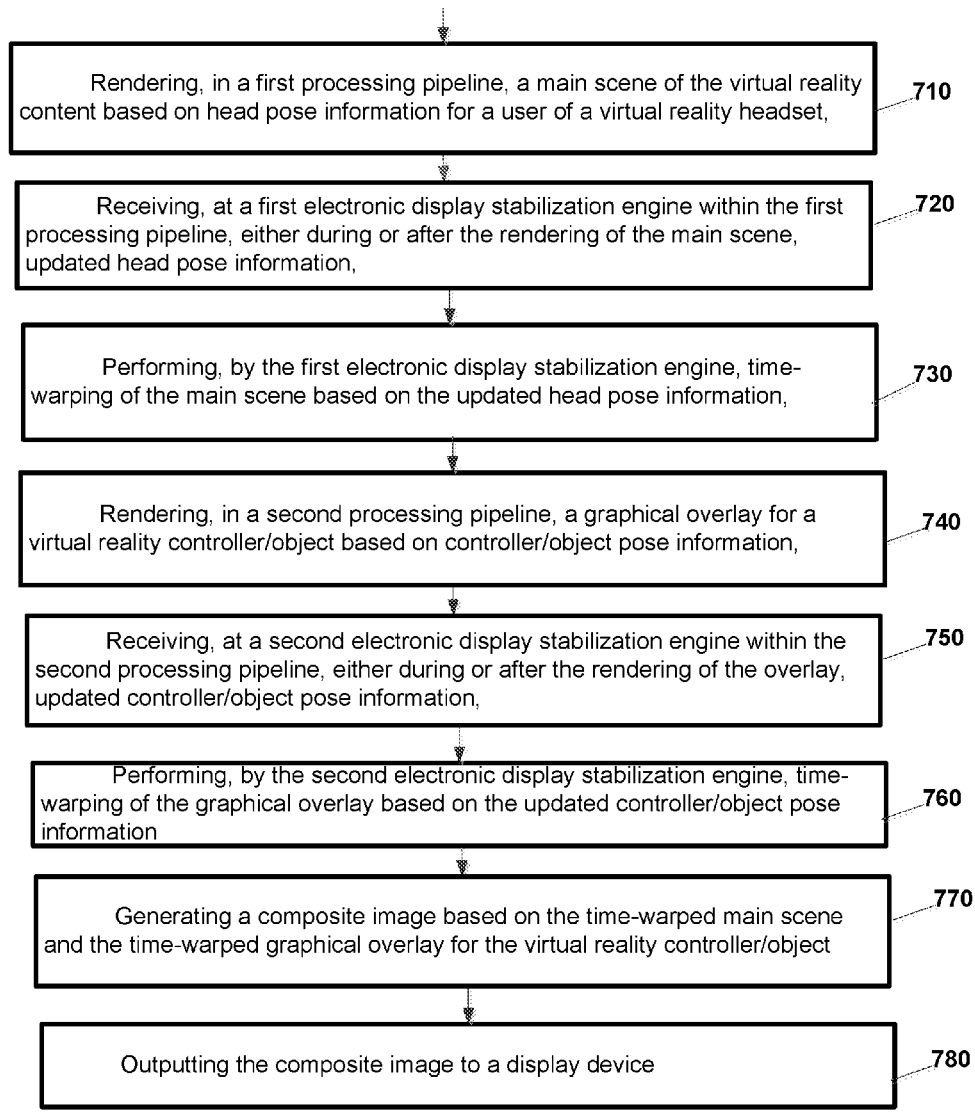
FIG. 7 is a flow chart illustrating operation of a virtual reality system according to another example implementation.

FIG. 7 is a flow chart illustrating operation of a VR system according to another example implementation. The flow chart may describe a method for rendering virtual reality content to a display device. Operation 710 includes rendering, in a first processing pipeline, a main scene of the virtual reality content based on head pose information for a user of a virtual reality headset. Operation 720 includes receiving, at a first electronic display stabilization engine within the first processing pipeline, either during or after the rendering of the main scene, updated head pose information. Operation 730 includes performing, by the first electronic display stabilization engine, time-warping of the main scene based on the updated head pose information. Operation 740 includes rendering, in a second processing pipeline, a graphical overlay for a virtual reality controller/object based on controller/object pose information. Operation 750 includes receiving, at a second electronic display stabilization engine within the second processing pipeline, either during or after the rendering of the overlay, updated controller/object pose information. Operation 760 includes performing, by the second electronic display stabilization engine, time-warping of the graphical overlay based on the updated controller/object pose information. Operation 770 includes generating a composite image based on the time-warped main scene and the time-warped graphical overlay for the virtual reality controller/object. And, operation 780 includes outputting the composite image to a display device.

Figure 8:
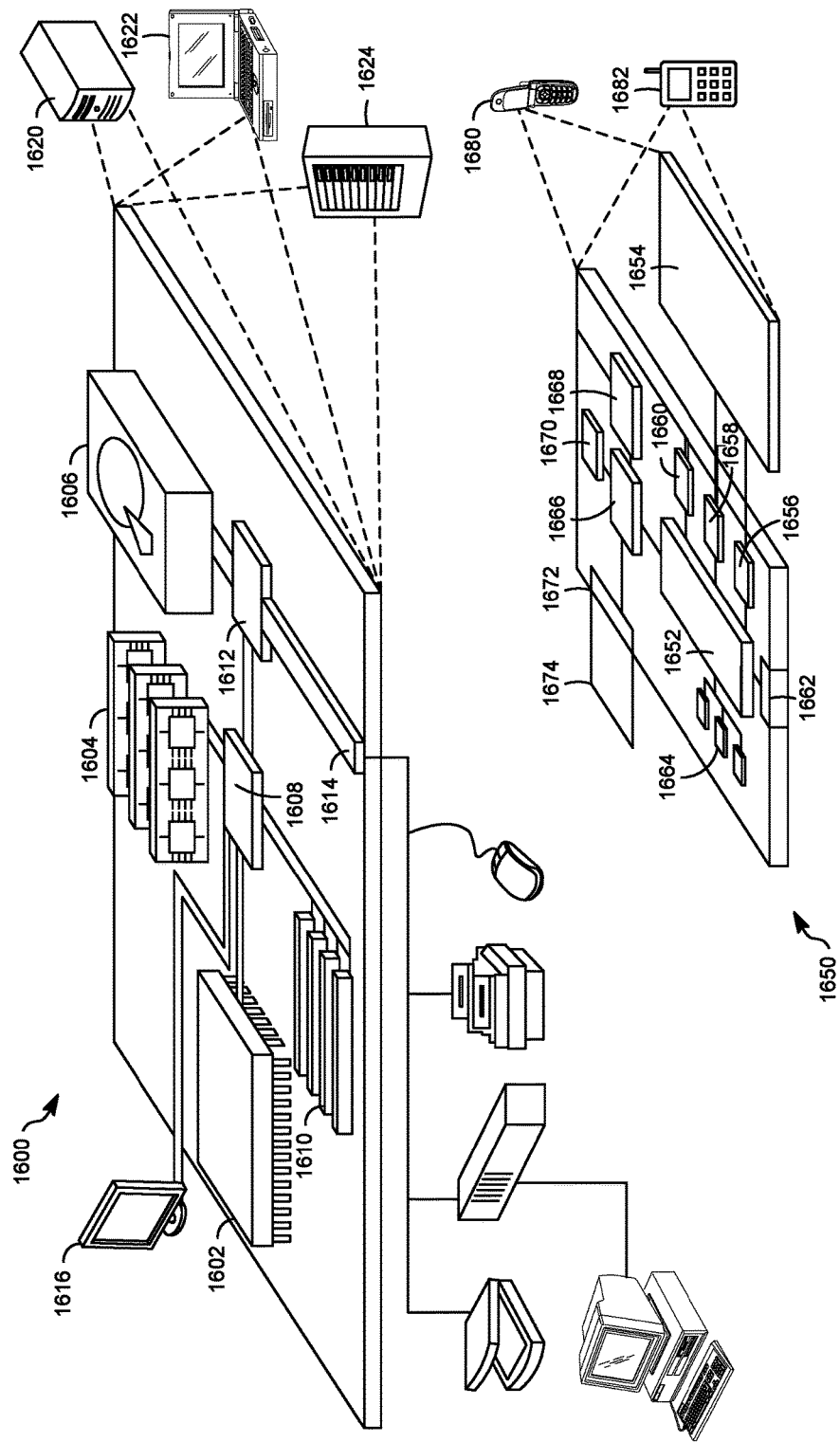
FIG. 8 shows an example of a generic computer device and a generic mobile computer device, which may be used with the techniques described here.

FIG. 8 shows an example of a generic computer device 1600 and a generic mobile computer device 1650, which may be used with the techniques described here. Computing device 1600 is intended to represent various forms of digital computers, such as laptops, desktops, workstations, personal digital assistants, servers, blade servers, mainframes, and other appropriate computers. Computing device 1650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT LCD (Thin-Film-Transistor Liquid Crystal Display) or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provided in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provide as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652, that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, Wi-Fi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smart phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    performing a first time-warping of a scene of virtual reality content based on head pose information received during or after a rendering of the scene to obtain a time-warped scene;
    performing a second time-warping of an object based at least on object pose information received during or after a rendering of the object to obtain a time-warped object; and
    displaying on a display device a composite image based on the time-warped scene and the time-warped object.

2. The method of claim 1:
    wherein the head pose information includes information indicating a head pose, the head pose information comprising at least one of location information indicating a location of a user's head or of a virtual reality headset worn by a user and orientation information indicating an orientation of the user's head or of the virtual reality headset.

3. The method of claim 1:
    wherein the head pose information comprises head pose information received from a tracking device that tracks a pose of a virtual reality headset worn by a user.

4. The method of claim 1:
wherein the object pose information includes information indicating an object pose, the object pose information comprising at least one of location information indicating a location of the object and orientation information indicating an orientation of the object.

5. The method of claim 1:
wherein the object comprises a virtual object to be displayed on the display device; and
wherein the object pose information comprises at least one of location information and orientation information of the virtual object.

6. The method of claim 5:
wherein the object comprises a virtual object to be displayed on the display device; and
wherein the object pose information comprises at least one of the following:
  at least one of location information and orientation information of the virtual object received from a virtual reality application; and
  at least one of location information and orientation information of the virtual object received from a tracking device that tracks a pose of a controller or other physical object that controls the location and orientation of the virtual object.

7. The method of claim 1, further comprising:
receiving a first head pose information;
performing a rendering of the scene based on the first head pose information; and
receiving a second head pose information during or after the rendering of the scene;
wherein performing the first time-warping of the scene comprises at least rotating the scene based on the second head pose information to obtain the time-warped scene.

8. The method of claim 1, further comprising:
receiving a first object pose information;
performing a rendering of the object based on the first object pose information; and
receiving a second object pose information during or after the rendering of the object;
wherein performing the second time-warping of the object comprises at least rotating the object based on the second object pose information to obtain the time-warped object.

9. The method of claim 1:
wherein the performing a second time-warping comprises performing a second time-warping, separate from the first time-warping, of an object based on the object pose information received during or after a rendering of the object.

10. The method of claim 1:
wherein the performing a first time-warping comprises performing a first time-warping, in a first processing pipeline, of a scene of virtual reality content based on the head pose information received during or after a rendering of the scene; and
wherein the performing a second time-warping comprises performing a second time-warping, separate from the first time-warping, in a second processing pipeline, of an object based on the object pose information received during or after a rendering of the object.

11. The method of claim 1 wherein the performing a second time-warping comprises:
performing a second time-warping of an object based on both the head pose information and the object pose information.

12. The method of claim 1 wherein the object comprises a virtual object having a location and orientation that is controlled based on a location and orientation of a virtual reality controller, wherein the performing a second time-warping comprises:
receiving, during or after a rendering of the virtual object, object pose information from the virtual reality controller, the object pose information including pose information for the virtual reality controller; and
performing a second time-warping of the virtual object that is controlled by the virtual reality controller based at least on the pose information for the virtual reality controller to obtain a time-warped virtual object.

13. The method of claim 1 wherein the object comprises a virtual object that is controlled by a virtual reality application, wherein the performing a second time-warping comprises:
receiving, during or after a rendering of the virtual object, object pose information for the virtual object from the virtual reality application; and
performing a second time-warping of the virtual object that is controlled by the virtual reality application based at least on the pose information for the virtual object to obtain a time-warped virtual object.

14. An apparatus comprising:
at least one processor;
a memory storing instructions that, when executed by the at least one processor, cause the apparatus to:
perform a first time-warping of a scene of virtual reality content based on head pose information received during or after a rendering of the scene to obtain a time-warped scene;
perform a second time-warping of an object based at least on object pose information received during or after a rendering of the object to obtain a time-warped object; and
display on a display device a composite image based on the time-warped scene and the time-warped object.

15. The apparatus of claim 14:
wherein the head pose information includes information indicating a head pose, the head pose information comprising at least one of location information indicating a location of a user's head or of a virtual reality headset worn by a user and orientation information indicating an orientation of the user's head or of the virtual reality headset.

16. The apparatus of claim 14:
wherein the head pose information comprises head pose information received from a tracking device that tracks a pose of a virtual reality headset worn by a user.

17. The apparatus of claim 14:
wherein the object pose information includes information indicating an object pose, the object pose information comprising at least one of location information indicating a location of the object and orientation information indicating an orientation of the object.

18. The apparatus of claim 14:
wherein the object comprises a virtual object to be displayed on the display device; and
wherein the object pose information comprises at least one of location information and orientation information of the virtual object.

19. The apparatus of claim 18:
wherein the object comprises a virtual object to be displayed on the display device; and
wherein the object pose information comprises at least one of the following:

at least one of location information and orientation information of the virtual object received from a virtual reality application; and at least one of location information and orientation information of the virtual object received from a tracking device that tracks a pose of a controller or other physical object that controls the location and orientation of the virtual object.

20. The apparatus of claim 14, the instructions further causing the apparatus to:

receive a first head pose information;

perform a rendering of the scene based on the first head pose information; and receive a second head pose information during or after the rendering of the scene;

wherein causing the apparatus to perform the first time-warping of the scene comprises causing the apparatus to at least rotate the scene based on the second head pose information to obtain the time-warped scene.

21. The apparatus of claim 14, the instructions further causing the apparatus to:

receive a first object pose information;

perform a rendering of the object based on the first object pose information; and receive a second object pose information during or after the rendering of the object;

wherein causing the apparatus to perform the second time-warping of the object comprises causing the apparatus to at least rotate the object based on the second object pose information to obtain the time-warped object.

22. The apparatus of claim 14:

wherein causing the apparatus to perform a second time-warping comprises causing the apparatus to perform a second time-warping, separate from the first time-warping, of an object based on the object pose information received during or after a rendering of the object.

23. The apparatus of claim 14:

wherein causing the apparatus to perform a first time-warping comprises causing the apparatus to perform a first time-warping, in a first processing pipeline, of a scene of virtual reality content based on the head pose information received during or after a rendering of the scene; and wherein causing the apparatus to perform a second time-warping comprises causing the apparatus to perform a second time-warping, separate from the first time-warping, in a second processing pipeline, of an object based on the object pose information received during or after a rendering of the object.

24. The apparatus of claim 14, wherein causing the apparatus to perform a second time-warping comprises causing the apparatus to:

perform a second time-warping of an object based on both the head pose information and the object pose information.

25. The apparatus of claim 14, wherein the object comprises a virtual object having a location and orientation that is controlled based on a location and orientation of a virtual reality controller, wherein causing the apparatus to perform a second time-warping comprises causing the apparatus to:

receive, during or after a rendering of the virtual object, object pose information from the virtual reality controller, the object pose information including pose information for the virtual reality controller; and perform a second time-warping of the virtual object that is controlled by the virtual reality controller based at least on the pose information for the virtual reality controller to obtain a time-warped virtual object.

26. The apparatus of claim 14, wherein the object comprises a virtual object that is controlled by a virtual reality application, wherein causing the apparatus to perform a second time-warping comprises causing the apparatus to:

receive, during or after a rendering of the virtual object, object pose information for the virtual object from the virtual reality application; and perform a second time-warping of the virtual object that is controlled by the virtual reality application based at least on the pose information for the virtual object to obtain a time-warped virtual object.

\* \* \* \* \*